(12) United States Patent
Vauchel et al.

(10) Patent No.: US 8,800,262 B2
(45) Date of Patent: Aug. 12, 2014

(54) THRUST REVERSER FOR A TURBOFAN ENGINE NACELLE

(75) Inventors: Guy Bernard Vauchel, Harfleur (FR);
Pierre Caruel, Le Harvre (FR)

(73) Assignee: Aircelle, Gonfreville l'Orcher (FR)

( * ) Notice: Subject to any disclaimer, the term of this patent is extended or adjusted under 35 U.S.C. 154(b) by 552 days.

(21) Appl. No.: 13/131,292

(22) PCT Filed: Nov. 23, 2009

(86) PCT No.: PCT/FR2009/052253
§ 371 (c)(1),
(2), (4) Date: Aug. 16, 2011

(87) PCT Pub. No.: WO2010/061107
PCT Pub. Date: Jun. 3, 2010

(65) Prior Publication Data
US 2011/0284660 A1    Nov. 24, 2011

(30) Foreign Application Priority Data

Nov. 26, 2008    (FR) ..................................... 08 06649

(51) Int. Cl.
*F02K 1/09*    (2006.01)
*F02K 1/54*    (2006.01)
*F02K 1/72*    (2006.01)

(52) U.S. Cl.
USPC ........... 60/226.2; 60/230; 60/232; 244/110 B; 239/265.31

(58) Field of Classification Search
USPC ............. 60/226.1–226.3, 228–230, 232, 771; 239/265.31, 265.29, 265.33; 244/110 B
See application file for complete search history.

(56) References Cited

U.S. PATENT DOCUMENTS

| 3,599,432 | A | 8/1971 | Ellis |
| 5,228,641 | A | 7/1993 | Remlaoui |
| 6,546,715 | B1 * | 4/2003 | Blevins et al. ............... 60/226.2 |
| 7,484,356 | B1 | 2/2009 | Lair |

FOREIGN PATENT DOCUMENTS

EP    1229237 A2    8/2002

OTHER PUBLICATIONS

International Search Report PCT/FR2009/052253; Dated Mar. 17, 2010.

* cited by examiner

*Primary Examiner* — Andrew Nguyen
(74) *Attorney, Agent, or Firm* — Brinks Gilson & Lione (57) ABSTRACT

The invention relates to a thrust reverser for a turbofan engine nacelle including a stationary portion (15) downstream from which is mounted at least one cowl (9) movable between a direct-jet position, in which the cowl (9) is aligned with the stationary portion (15), and a thrust-reversal position, in which the mobile cowl (9) is spaced apart from the stationary portion (15) so as to define an opening for the passage of a secondary flow (F), a means for deflecting (16) the secondary flow (F) through the passage opening, an actuator means (45) and a means (24) for guiding the mobile cowl (9) relative to the stationary portion (15), at least a first and a second adjacent cascade vane (13), positioned at an angle (B) relative to the movement axis (A) of the mobile cowl (9), arranged opposite the passage opening such that the deflected secondary flow (F) at least partially passes through the first and second vanes (13) in order to increase the deflection of said secondary flow (F) in the upstream direction, said actuator means (45) and means (24) for guiding the mobile cowl (9) being arranged between the first and second vanes (13). A covering wall (31) connects said first and second vanes (13), bypassing said actuator means (45) and guiding means (24).

8 Claims, 9 Drawing Sheets

THRUST REVERSER FOR A TURBOFAN ENGINE NACELLE

TECHNICAL FIELD

The invention relates to a thrust reverser for a turbofan engine nacelle.

BACKGROUND

An airplane is moved by several turbojet engines each housed in a nacelle also housing a set of related actuating devices connected to its operation and performing various functions when the turbojet engine is operating or stopped. These related actuating devices in particular comprise a mechanical system for actuating thrust reversers.

Figure 1:
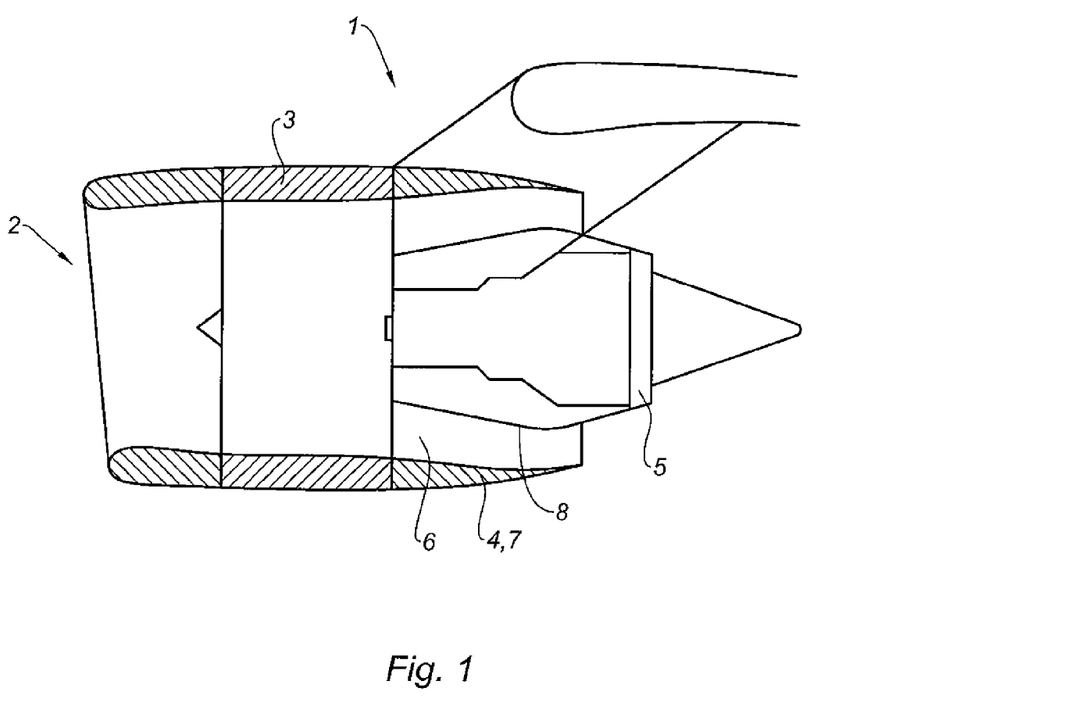
FIG. 1 is a diagrammatic view of a nacelle in longitudinal cross-section.

As shown in FIG. 1, a nacelle 1 generally has a tubular structure comprising an air intake 2 upstream of the turbojet engine, a middle section 3 designed to surround a fan of the turbojet engine, a downstream section 4 housing thrust reverser means and designed to surround the combustion chamber of the turbojet engine, and generally ends with jet nozzle 5, the outlet of which is located downstream of the turbojet engine. Modern nacelles are designed to house a turbofan engine capable of generating, via internal blades of the body of the engine, a hot air flow (also called primary flow) coming from the combustion chamber of the turbojet engine, and via the fan blades, a cold air flow (secondary flow) that circulates outside the turbojet engine through an annular channel 6, also called stream, formed between a fairing of the turbojet engine 7 and an internal structure 8 of the nacelle. The two air flows are ejected from the turbojet engine through the rear of the nacelle 1.

The role of a thrust reverser is, during landing of an aircraft, to improve the braking capacity thereof by reorienting at least part of the thrust generated by the turbojet engine forward. In this phase, the reverser obstructs the stream of the cold flow and orients it towards the front of the nacelle, thereby creating a counter-thrust that is added to the braking of the airplane's wheels.

The means implemented to perform this reorientation of the cold flow vary depending on the type of reverser.

However, in any case, the structure of a reverser comprises elements that can be moved between, on one hand, a deployed position in which they open, in the nacelle, a passage for the deflected flow, and on the other hand, a retracted position in which they close said passage. These cowls can perform a deflecting function or simply activate other deflecting means.

Figure 2:
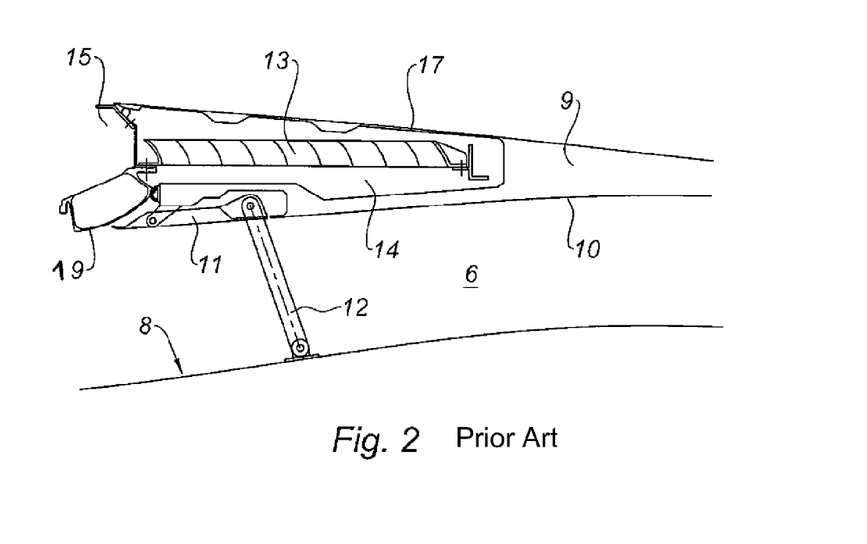
FIGS. 2 and 3 are enlarged diagrammatic views, in longitudinal cross-section, of a thrust reverser of the prior art, in the direct-jet position and the thrust-reversal position, respectively.
Figure 3:
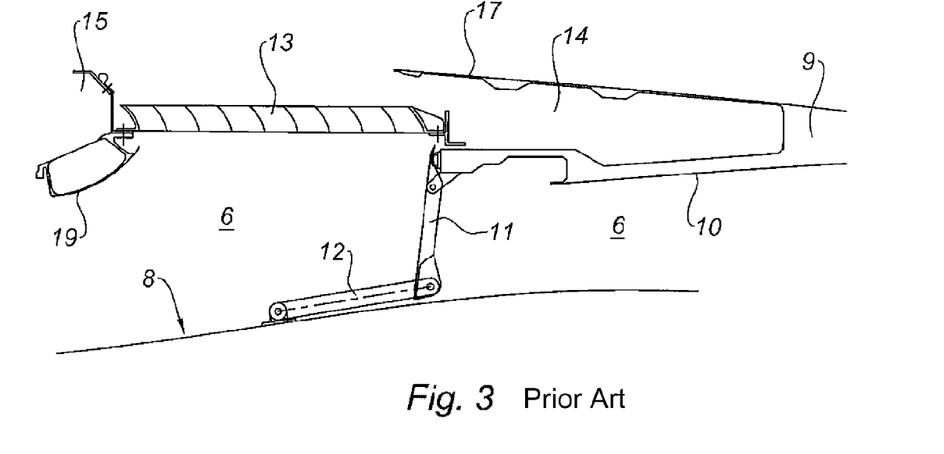

A reverser of the prior art is illustrated in FIGS. 2 and 3. This reverser is of the vane reverser or cascade vane reverser type.

This type of reverser includes at least one cowl 9 that can move relative to a stationary structure 15, said cowl 9 having an outer wall 17 and an inner wall 10 intended to define, in a direct jet position of the turbojet engine (FIG. 2), an outer wall of the annular channel 6 in which the secondary flow flows. The reverser also includes at least one flap 11 pivotably mounted on the mobile cowl 9 and actuated by at least one connecting rod 12 when the mobile cowl is moved downstream, such that, in a thrust-reversal position (FIG. 3), each flap 11 includes a zone extending in the annular channel 6 so as to at least partially deflect the secondary flow outside said annular channel 6.

In the case of this type of reverser, the reorientation of the secondary flow is done by cascade vanes 13, the mobile cowl 9 simply serving for sliding aiming to expose or cover said vanes, the translation of the mobile cowl 9 being done along a longitudinal axis substantially parallel to the axis of the nacelle 1.

A housing 14 is formed in the mobile cowl 9 and makes it possible to house the vanes 13 when the reverser is not actuated, i.e. in the direct jet position, as shown in FIG. 2.

The vanes 13 are arranged adjacent to each other, in an annular zone surrounding the annular channel 6, the vanes 13 being arranged edge to edge so that no space is formed between them. In this way, the entire secondary flow deflected by the flaps 11 passes through the vanes 13. The means for moving and guiding the mobile cowl (not shown) is arranged under the vanes 13.

Figure 4:
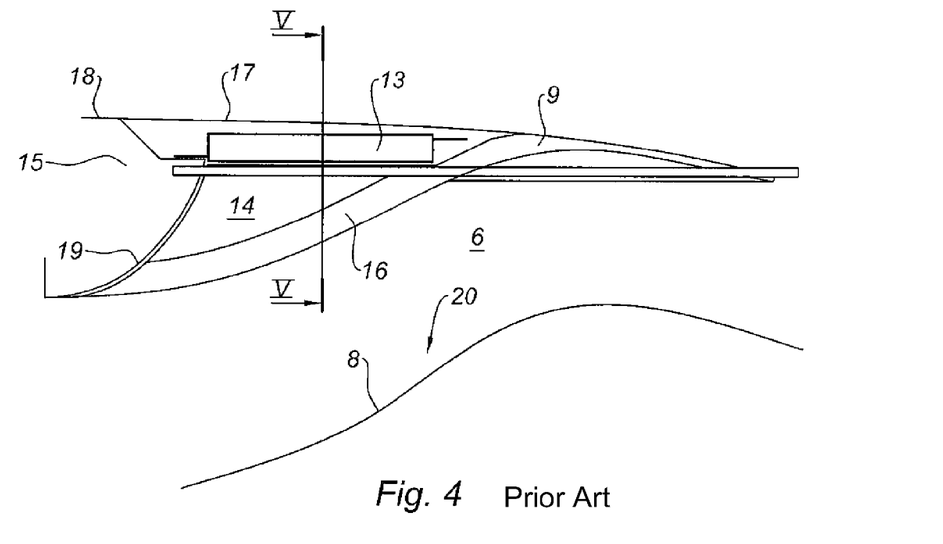
FIG. 4 is a diagrammatic view, in longitudinal cross-section, of another thrust reverser of the prior art.
Figure 5:
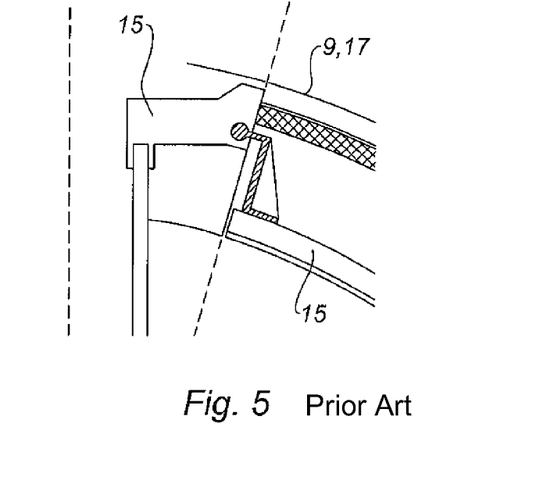
FIG. 5 is a partial cross-sectional view along line V-V, of a portion of the reverser of FIG. 2.

Another reverser of this type is shown diagrammatically in FIG. 4. In that figure, elements having the same function as before have been designated using the same references.

This reverser does not have a deflection flap 11. The cowl 9 is mounted so as to be able to move relative to a stationary part, called front frame 15. The cowl 9 includes an inner wall 10, defining a peripheral wall of the annular channel 6 and an outer wall 17 aligned with an outer wall 18 of the front frame 15.

The front frame 15 includes a rounded deflection edge 19 extending from the periphery of the annular channel 6 to the upstream end of the vanes 13.

Figure 6:
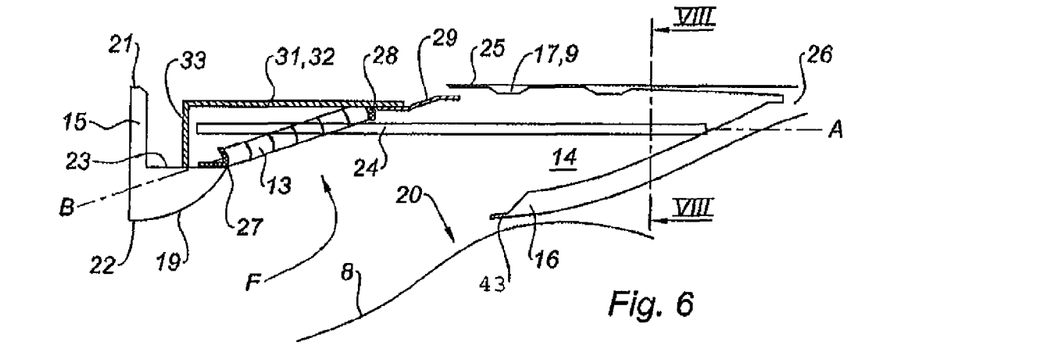
FIG. 6 is a diagrammatic view, in longitudinal cross-section, of a first embodiment of the invention, in the thrust-reversal position.

The nacelle includes an internal structure 8 defining the inner wall of the annular channel 6 and having a wider zone 20 of the diameter of said internal structure 8. The annular channel then forms an S-shaped stream. The free end 43 of the inner wall 16 of the mobile cowl 9 is aligned with or close to said wider zone 20, in the thrust reversal position (FIG. 6). In this way, the secondary flow F flowing in the annular channel 6, from upstream to downstream, is blocked by the inner wall 16 of the cowl, then escapes towards the outside, through the deflection vanes 13.

For efficiency reasons, the deflection edge 19 must have a large curve radius. Moreover, in order to be able to maximally increase the length of the vanes 13 so as to maximally deflect the secondary flow F in the upstream direction, it is necessary to arrange the vanes 13 as close as possible to the outer wall 17 of the cowl 9. The limited length of the housing of the mobile cowl 9 and the large radius of the deflection edge 19 result in reducing the length of the vanes 13.

In order to offset this drawback, it is known to arrange the vanes at an angle. The set of vanes then extends like a cone section, around the annular channel.

Document EP 1 229 237 describes such a reverser, in which the vanes are arranged at an angle. In this case, however, it is no longer possible to arrange the means for moving and guiding the mobile cowl under the vanes. The vanes are then spaced apart from each other so that the aforementioned movement and guiding means is arranged between two adjacent vanes.

In that case, part of the secondary flow can escape into the space formed between the vanes, which results in decreasing the deflection of the secondary flow and therefore the effectiveness of the reverser.

BRIEF SUMMARY

The invention aims to resolve these drawbacks by proposing a reverser making it possible to improve the deflection of the secondary flow in the upstream direction.

To that end, the invention relates to a thrust reverser for a turbofan engine nacelle comprising a stationary portion downstream from which is mounted at least one cowl movable between a direct-jet position, in which the cowl is aligned with the stationary portion, and a thrust-reversal position, in which the mobile cowl is spaced apart from the stationary portion so as to define an opening for the passage of a secondary flow, a means for deflecting the secondary flow through the passage opening, an actuator means and a means for guiding the mobile cowl relative to the stationary portion, at least a first and a second adjacent cascade vane, positioned at an angle relative to the movement axis of the mobile cowl, arranged opposite the passage opening such that the deflected secondary flow at least partially passes through the first and second vanes in order to increase the deflection of said secondary flow in the upstream direction, said actuator means and means for guiding the mobile cowl being arranged between the first and second vanes, characterized in that a covering wall connects said first and second vanes, bypassing said actuating and guide means.

The covering means thus makes it possible to cover the space between two adjacent vanes spaced apart from each other, without interfering with the actuating and guide means. The secondary flow is therefore then necessarily oriented towards the cascade vanes, which results in increasing the effectiveness of the reverser.

According to one feature of the invention, the covering wall is made up, at least in part, of an additional cascade vane, arranged to increase the deflection of said secondary flow in the upstream direction.

In this way, the vane surface area is further increased, which favors the deflection of the flow in the upstream direction accordingly.

Advantageously, the reverser includes an outer wall, an inner wall intended to define a peripheral wall of an annular channel in which the secondary flow flows, the first and second vanes diverging outwardly, from upstream to downstream, the additional vane forming an angle with said first and second vanes, so as to form an outer recess relative thereto.

The movement and guide means can thus be housed in the recess.

According to one possibility of the invention, the adjacent vanes form an angle smaller than or equal to 30° with the movement axis of the mobile cowl.

Preferably, the additional vane is connected to each of the first and second adjacent vanes via a connecting wall.

According to one feature of the invention, the connecting wall includes a first surface connected to one of the first and second vanes, the additional vane, respectively, and a second surface equipped with a deflecting means extending from said second face to the additional vane, the first or second vane, respectively.

The deflecting means makes it possible to further improve the deflection of the secondary flow in the upstream direction.

Advantageously, the mobile cowl includes at least one housing open in the upstream direction, in which the first and second vanes are housed, in the direct-jet position of the reverser.

The invention also relates to a turbofan engine nacelle including a thrust reverser according to the invention.

Advantageously, the nacelle includes an internal structure, defining the inner wall of the annular channel and having a wider zone, the inner wall of the cowl having a free end aligned with or close to said wider zone, in the thrust-reversal position.

The invention also relates to an aircraft including at least one nacelle according to the invention.

BRIEF DESCRIPTION OF THE DRAWINGS

The invention will be better understood using the following description done in reference to the appended diagrammatic drawing showing, as examples, several embodiments of this thrust reverser.

DETAILED DESCRIPTION

Figure 7:
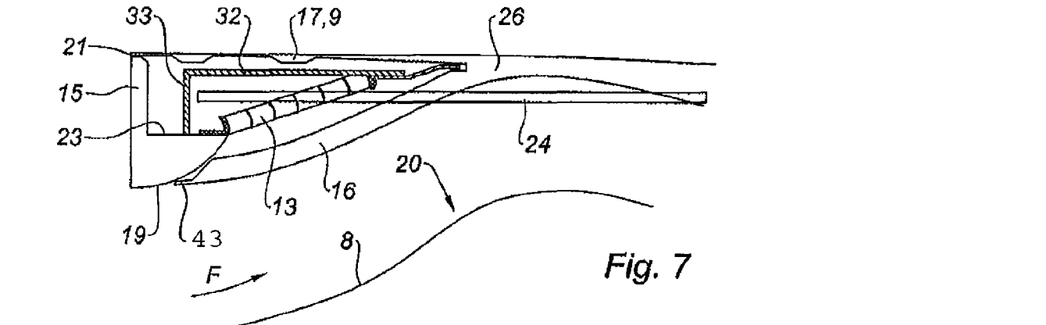
FIG. 7 is a view corresponding to FIG. 6, in the direct-jet position.

A thrust reverser according to a first embodiment of the invention is shown in FIGS. 6 and 7.

This thrust reverser equips a nacelle 1 of the type previously described in reference to FIG. 1.

The reverser includes a front frame 15 or stationary structure, fastened on an engine casing of the turbojet engine, a mobile cowl 9, an outer wall, an annular channel 6 inside which a secondary flow F circulates, and an internal structure 8, having a wider zone 20. The upstream and downstream positions used hereinafter are defined relative to the direction of the secondary flow F.

The front frame 15 includes an outer wall 21 and an inner wall 22, facing the annular channel 6 side and having a deflection edge 19 with a generally round shape. The front frame 15 also includes a shoulder 23, facing the outside.

The cowl 9 is mounted downstream of the front frame 15 and movably relative thereto, between a direct-jet position (FIG. 7) and a thrust-reversal position (FIG. 6). The movement of the mobile cowl 9 is actuated using a plurality of jacks 45, the guiding of said cowl 9 being ensured by a plurality of rails 24. The jacks 45 and the rails 24 are distributed on the periphery of the nacelle 1.

The mobile cowl 9 includes an upstream end 25, facing the front frame 15 side, a downstream end, an outer wall 17 aligned with that 21 of the front frame 15 in the direct-jet position (FIG. 7) and an inner wall 16, also defining a portion of the annular channel 6. The inner and outer walls 16, 17 come together in a middle zone 26 of the mobile cowl 9 and define, between them and upstream of said middle zone 26, a central housing 14 emerging in the upstream direction.

The housing 14 is designed to receive cascade vanes 13 for the secondary flow in the direct-jet position, as shown in FIG. 7.

Said vanes 13 are arranged in an annular zone, adjacent to each other. The term adjacent does not necessarily mean that the vanes are arranged edge to edge, as explained below.

Each vane 13 extends at an angle relative to the movement axis A of the mobile cowl 9, between a first end 27 fastened on the front frame 15 and a second end 28 fastened on a fitting 29, stationary relative to upper and lower longitudinal structures, not referenced in the drawing, which themselves are stationary relative to the front frame 15. Said vanes 13 are therefore stationary relative to the front frame 15.

As shown in FIG. 6, each vane 13 assumes the form of a tapered portion, i.e. the first and second ends 27, 28 of each vane 13 have an arc of circle shape, each vane 13 also extending along an angled generatrix B, forming an angle with the movement axis A of the mobile cowl 9.

The vanes 13 are inclined from the inside towards the outside, from upstream to downstream.

It will be recalled that, as previously seen, the movement axis A of the mobile cowl 9 is parallel to the general axis of the nacelle 1.

Given the angled arrangement of the vanes 13, it is necessary to space some vanes 13 apart from each other, so as to form a space 30 allowing the passage of jacks 45 and/or rails 24, depending on the position of the vanes 13. Some vanes 13 can thus be alongside each other, others being spaced apart from each other.

Figure 8:
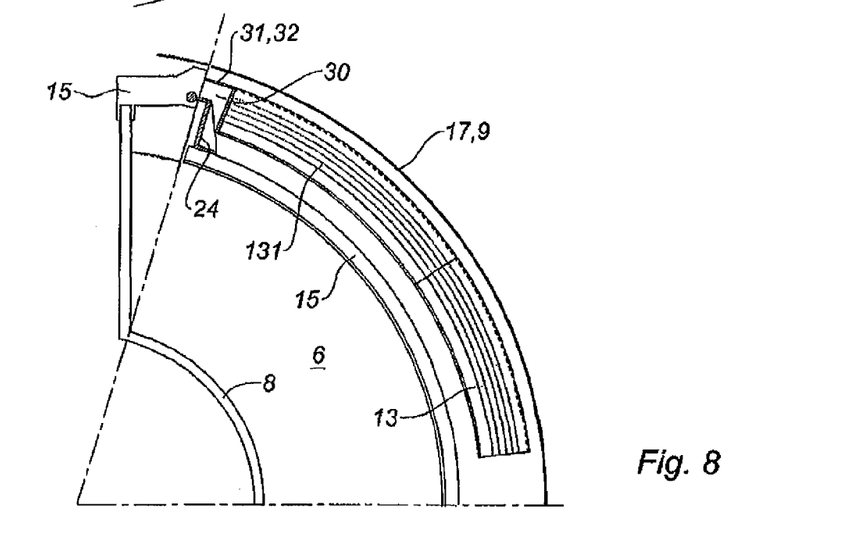
FIG. 8 is a partial cross-sectional view along line VIII-VIII, of a portion of the reverser of FIG. 6.

In the zones where two adjacent vanes 131, 132 are spaced apart from each other, a solid covering wall 31 covers the space 30 and bypasses the corresponding rail 24 or jack 45.

More particularly, the wall 31 connects the two corresponding adjacent vanes 131, 132. Said wall 31 has a peripheral zone 32 with a general cylindrical portion shape, situated radially at the second end 28 of said vanes 131, 132.

The connecting wall 31 thus extends from one adjacent vane 131 to the other 132 and from one end 27 to the other 28 of the vanes 131, 132, following a generatrix parallel to the movement axis A of the cowl 9. The covering wall 31 also includes an upstream bottom 33 connecting the peripheral zone 31 to the front frame 15.

In this way, part of the secondary flow F is prevented from escaping through the space 30, the entire secondary flow F passing through the vanes 13.

Depending on the applications, it is possible to form small openings in said covering wall 31, without having a significant impact on the effectiveness of the reverser.

Figure 9:
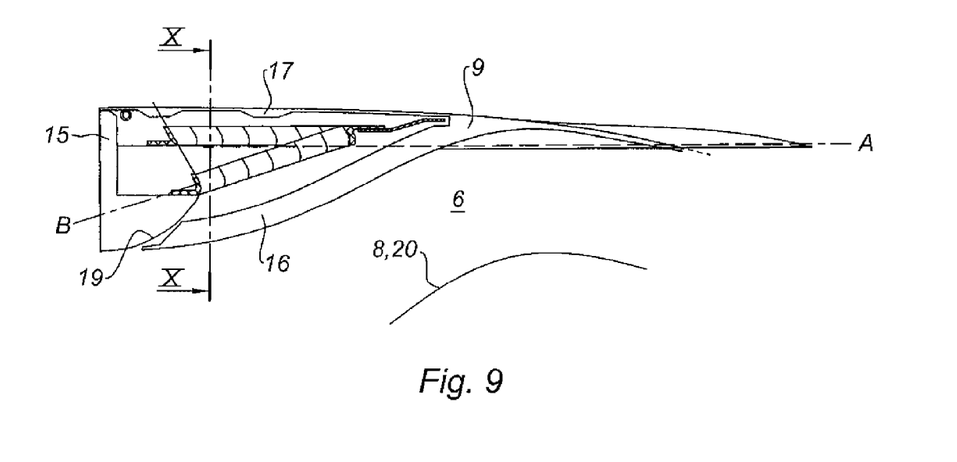
FIG. 9 is a diagrammatic view, in longitudinal cross-section, of a second embodiment of the invention.
Figure 10:
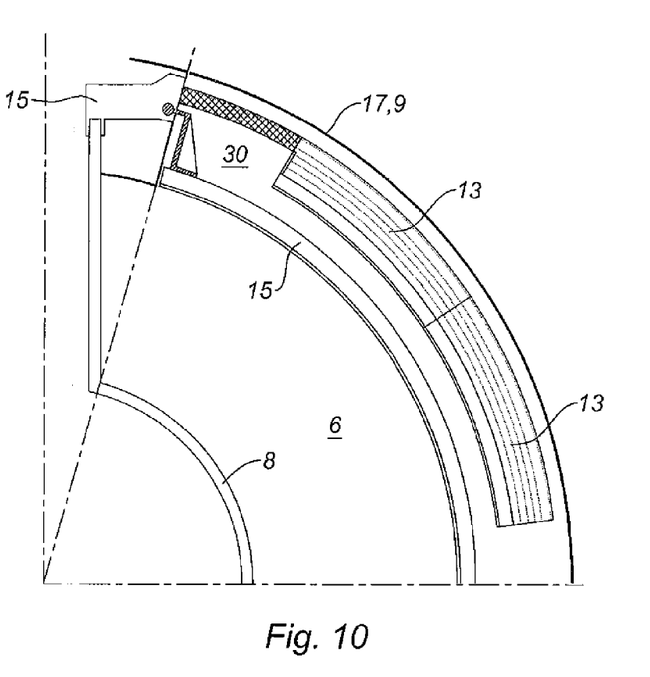
FIG. 10 is a partial cross-sectional view along line X-X, of a portion of the reverser of FIG. 9.
Figure 11:
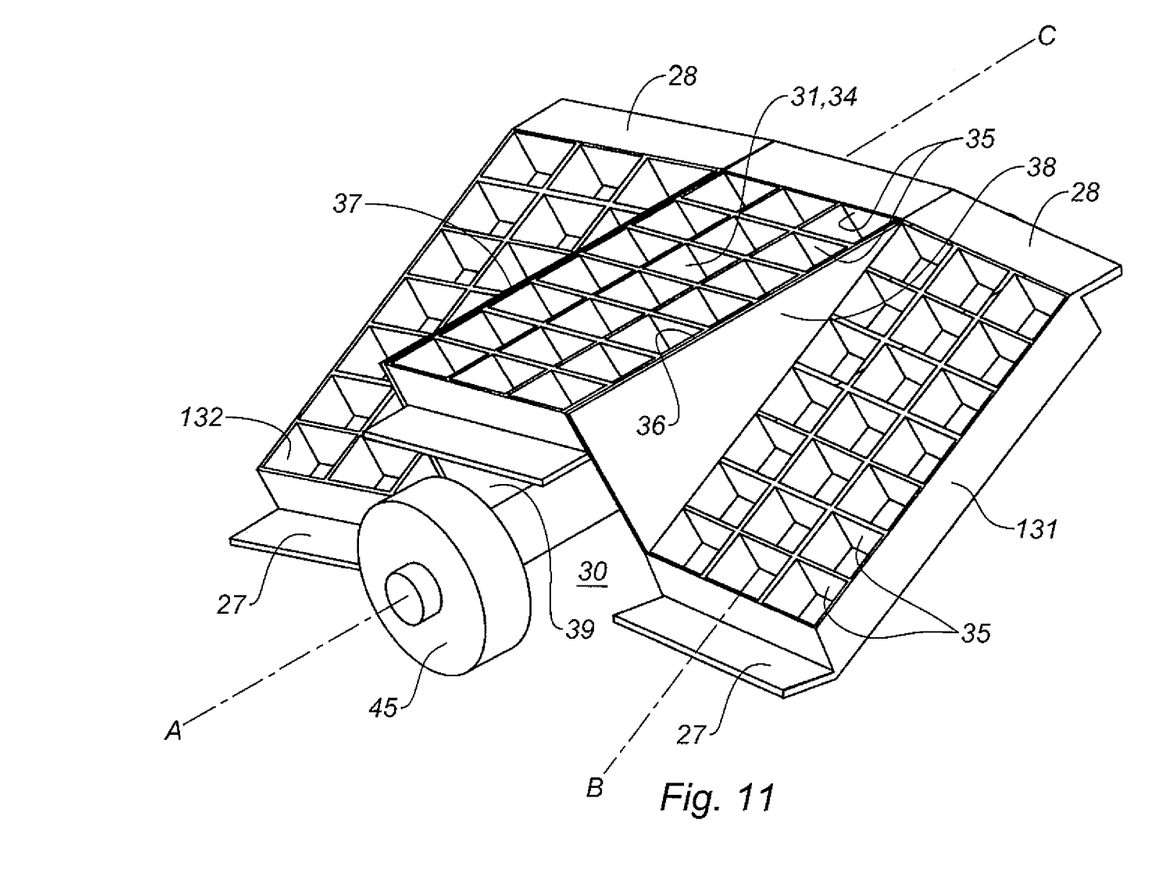
FIG. 11 is a perspective view of two adjacent vanes connected by an additional vane.

In an embodiment shown in FIGS. 9 to 11, the covering wall 31 is made up, at least in part, of an additional cascade vane 34 similar to the cascade vanes 13, having fins or blades 35 included in the upstream direction.

According to a first alternative, said additional cascade vane is generally in the shape of a cylinder portion and follows a generatrix parallel to axis A. As before, said vane is situated radially at the level or height of the second end 28 of the vanes 131, 132.

According to a second alternative, shown in FIGS. 9 to 11, the additional cascade vane 34 follows a generatrix C forming an angle with axis A, the angle being smaller, however, than the incline angle of the vanes 131, 132. As with the vanes 13, the additional vane 34 extends from the inside out and from upstream to downstream.

In other words, the first alternative corresponds to the second alternative with a zero angle between the generatrix C and the axis A. Regardless of the embodiment, the covering wall 31 thus forms a recess towards the outside, relative to the vanes 131, 132 in which the rails 24 or the jacks 45 (FIG. 11) can be housed.

In the embodiment shown in FIG. 11, the additional vane 34 includes first and second lateral edges 36, 37 connected to the corresponding edges of the first and second adjacent vanes 131, 132, respectively, via first and second connecting walls 38, 39, respectively, extending radially. The jack 45 is thus covered and housed in the recess formed by the additional vane 34 and the two connecting walls 38, 39.

Figure 12:
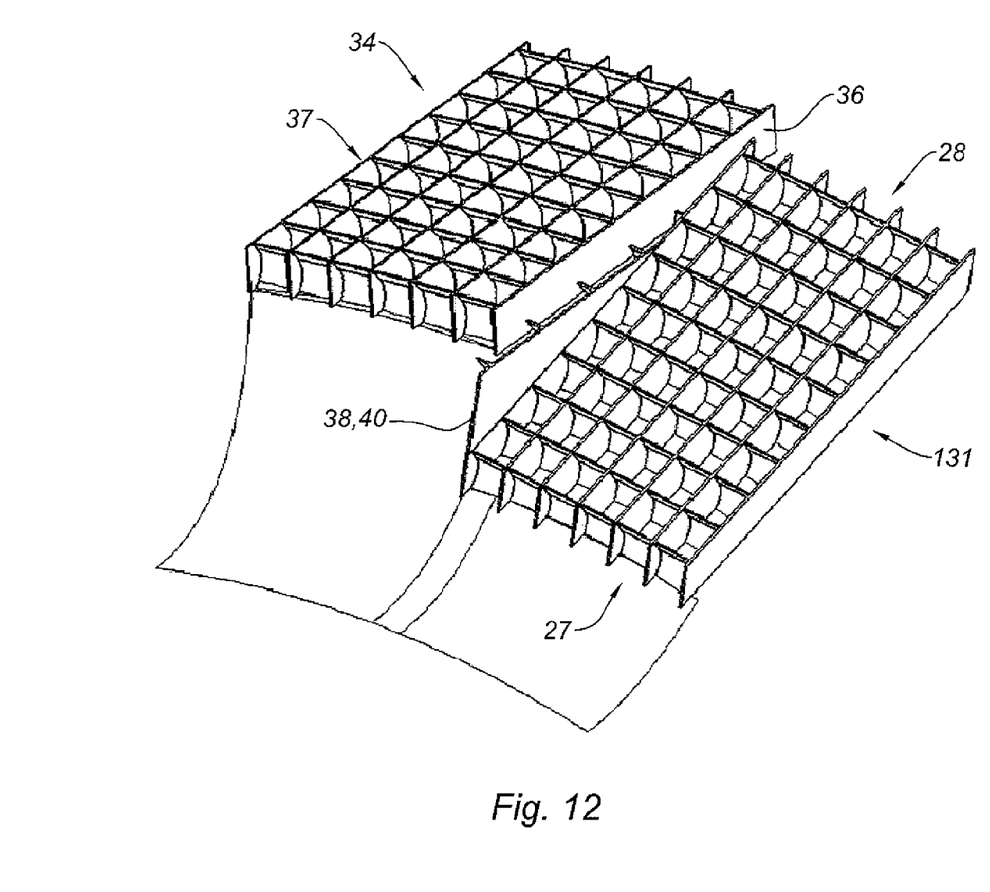
FIGS. 12 and 13 are perspective top views of the first vane and an additional vane, according to a third embodiment.
Figure 13:
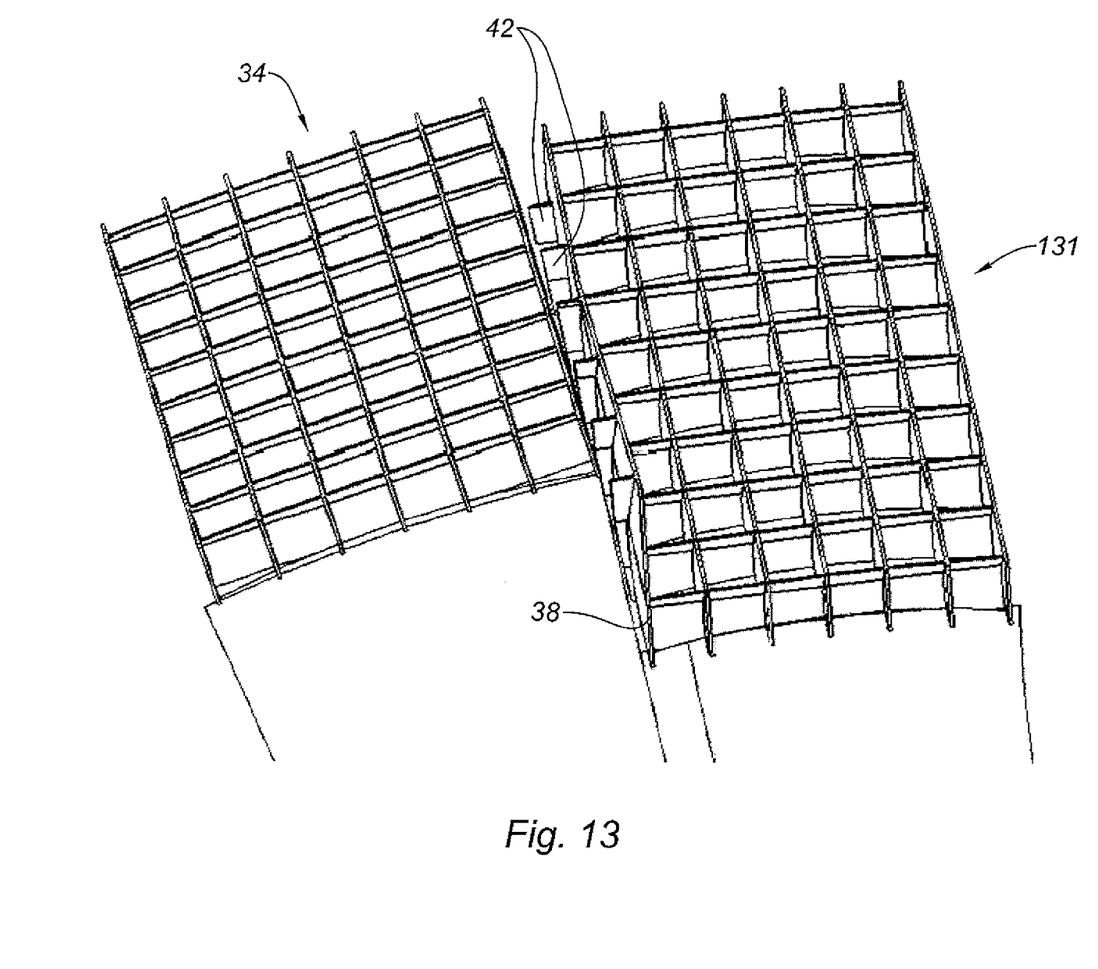
Figure 14:
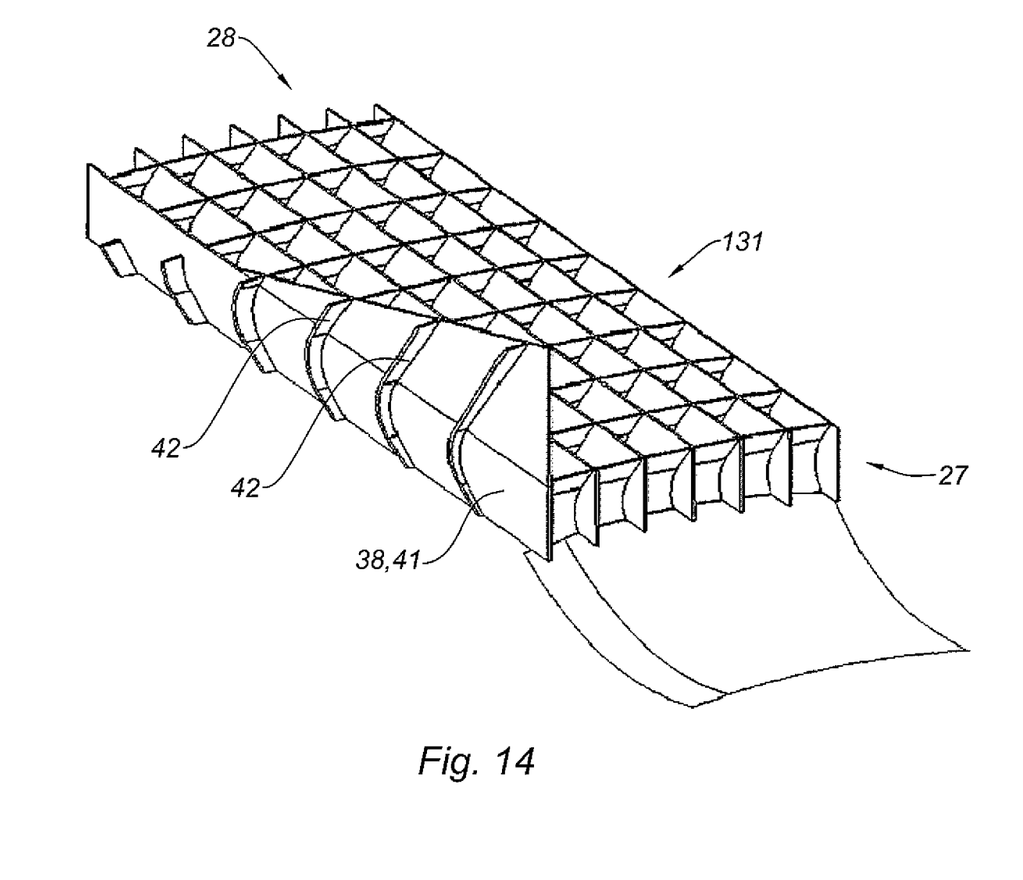
FIG. 14 is a perspective view of the first vane.

According to another embodiment shown in FIGS. 12 to 14, each connecting wall 38, 39 is molded with the corresponding vane 131, includes a first surface 40 situated on the side of said vane 131, and a second surface 41 equipped with a deflecting means 42 extending from said second surface 41 to the corresponding lateral edge 36 of the additional vane 34. The deflecting means 42 is formed by curved fins, oriented so as to deflect the secondary flow F in the upstream direction passing between the second surface 41 of the connecting wall 38 and the corresponding edge 36 of the additional vane 34.

Although in FIGS. 12 and 13 only the first vane 131 and the first connecting wall 38 are shown, the reverser is still equipped with a second connecting wall 39, similar to the first, and making it possible to connect the second vane 132 to the additional vane 34.

Of course, the connecting wall 38, 39 could also be molded with the additional vane 34 and extend towards the corresponding vane 131, 132.

Obviously, the invention is not limited solely to the embodiments of this thrust reverser described above as examples, but rather encompasses all alternatives thereof. In particular, the flow deflecting means could comprise one or more flaps, similar to those illustrated in FIGS. 2 and 3.

The invention claimed is:

1. A thrust reverser for a turbofan engine nacelle comprising:
    a stationary portion downstream from which is mounted at least one mobile cowl movable between a direct-jet position, in which the mobile cowl is aligned with the stationary portion, and a thrust-reversal position, in which the mobile cowl is spaced apart from the stationary portion so as to define an opening for a passage of a secondary flow;
    a means for deflecting the secondary flow through the opening;
    an actuator means;
    a means for guiding the mobile cowl relative to the stationary portion;
    at least a first and a second adjacent cascade vane, positioned at an angle relative to a movement axis of the mobile cowl, arranged opposite the opening such that the deflected secondary flow at least partially passes through the first and second adjacent cascade vanes in order to increase a deflection of said secondary flow in an upstream direction; and
    an outer wall and an inner wall to define a peripheral wall of an annular channel in which the secondary flow flows, the first and second adjacent cascade vanes diverging outwardly, from upstream to downstream, an additional vane forming an angle with said first and second adjacent cascade vanes, so as to form an outer recess relative thereto
    wherein said actuator means and means for guiding the mobile cowl are arranged between the first and second adjacent cascade vanes, and wherein a covering wall connects said first and second adjacent cascade vanes, bypassing said actuating means and guide means wherein the covering wall comprises the additional cascade vane, arranged to increase the deflection of said secondary flow in the upstream direction.

2. The reverser according to claim 1, wherein the first and second adjacent cascade vanes form an angle smaller than or equal to 30° with the movement axis of the mobile cowl.

3. The reverser according to claim 1, wherein the additional cascade vane is connected to each of the first and second adjacent cascade vanes via the connecting wall.

4. The reverser according to claim 3, wherein the connecting wall comprises a first surface connected to one of the first and second adjacent cascade vanes, and to the additional cascade vane, and a second surface equipped with a deflecting means extending from said second surface to the additional cascade vane.

5. The reverser according to claim 1, wherein the mobile cowl includes at least one housing open in the upstream direction, in which the first and second adjacent cascade vanes are housed, in the direct-jet position of the reverser.

6. A turbofan engine nacelle, comprising a thrust reverser according claim 1.

7. The nacelle according to claim 6, further comprising an internal structure, defining an inner wall of the annular channel and having a wider zone, the inner wall of the mobile cowl having a free end aligned with or close to said wider zone, in the thrust-reversal position.

8. An aircraft comprising at least one nacelle according to claim 7.

* * * * *